United States Patent Office 2,802,947
Patented Aug. 13, 1957

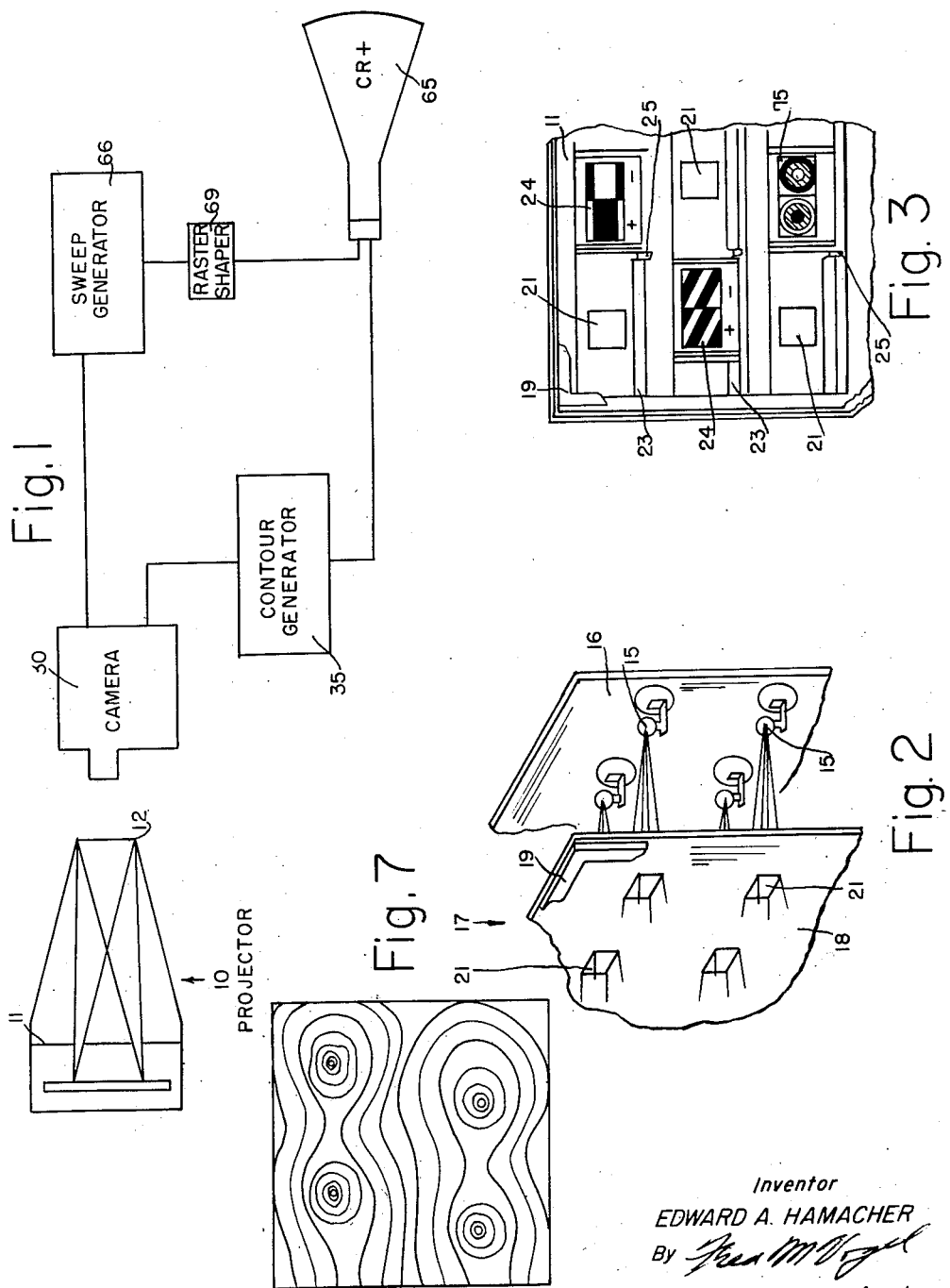

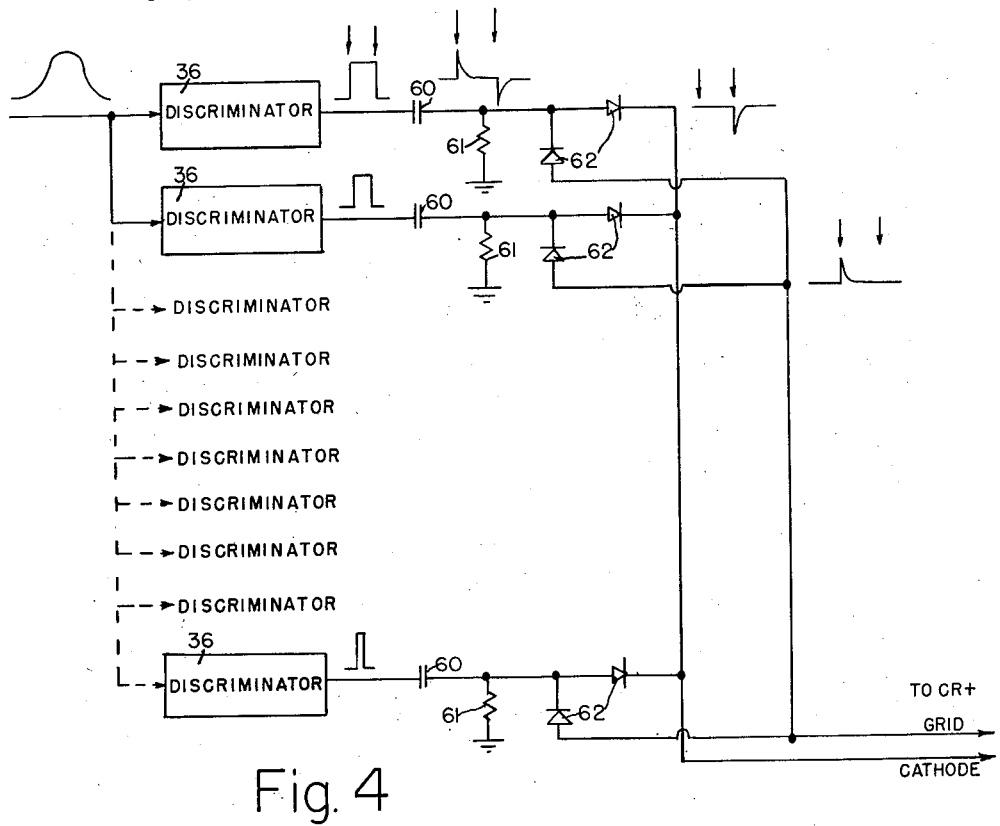
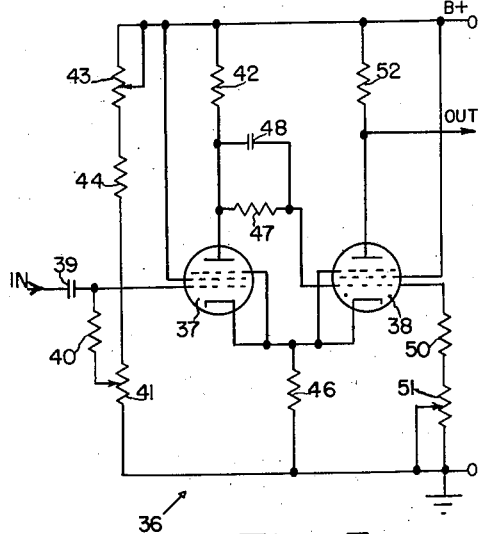
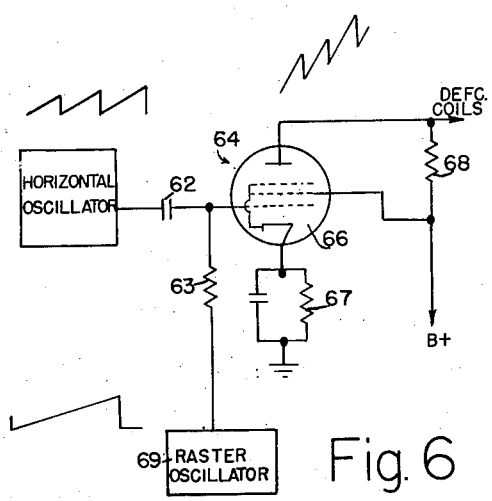
Fig. 4
Fig. 5
Fig. 6
Inventor
EDWARD A. HAMACHER
By
Agent

2,802,947

APPARATUS FOR DETERMINING CRYSTAL STRUCTURE

Edward A. Hamacher, Irvington-on-Hudson, N. Y., assignor, by mesne assignments, to North American Philips Company, Inc., New York, N. Y., a corporation of Delaware Application May 5, 1953, Serial No. 353,049

16 Claims. (Cl. 250—51)

This invention relates to an apparatus for and a method of determining the crystal structure of matter.

A technique for determining the crystal structure of matter involves the concept of the unit cell of the crystal—the smallest unit within the crystal which, when extended in three dimensions, will reproduce the original crystal—as consisting of a continuous distribution of diffracting matter having maxima in the regions occupied by the atoms. The density function of the diffracting matter may therefore be expressed as the sum of a suitable Fourier series.

In accordance with a well-known technique, the various terms of the Fourier series are obtained optically by employing a prepared set of masks, hereinafter referred to as "Huggins Masks," each of which consists of a pattern of light and dark bands representing a particular term of the Fourier series. Each of the terms of the Fourier series represented by the masks can be summed optically by superposing the images of the masks, each of said images having an intensity (or amplitude) determined by conventional X-ray data, by simultaneously projecting the masks onto a single photographic plate which is thereafter developed. The result appears as a pictorial representation of the projection of the atoms on a plane as they are arranged in the crystal, the atoms appearing as dark, or clusters of dark, spots on a white background.

The main disadvantage of the above-described technique is that the pictorial representation of the unit cell is in the form of light and dark spots, and very little quantitative information about the unit cell is obtainable from such an image. Furthermore, the picture on the developed photographic plate is always rectangular or square—where the actual unit cell of the crystal investigated might have a different shape, e. g., a rhombus—so that the dark spots, representing the atoms, would not be occupying their correct positions relative to the boundaries of the cell. A further drawback of this technique is the difficulties of working with photographic materials.

One object of the present invention is to provide a projection apparatus of the foregoing type for determining the crystal structure of matter in which the pictorial representation of the unit cell is presented in the form of a contour map.

Another object of the present invention is to provide a projection apparatus of the foregoing type for determining the crystal structure of matter in which the pictorial representation of the unit cell is presented in the form of a contour map on the face of a cathode-ray tube.

Still a further object of the invention is to provide a projection apparatus of the foregoing type in which the pictorial representation of the unit cell may be shaped to conform to the shape of the different unit cells that may be studied.

A still further object of the invention is to provide a projection apparatus of the foregoing type in which the pictorial representation of the unit cell appears in the form of a contour map on the face of a cathode-ray tube and in which calibrating means are provided for checking the linearity of the apparatus to assure accurate contours.

These and further objects of the invention will best be understood from the following description.

In order to facilitate the obtainment of information from a pictorial representation of a unit cell in terms of a density function of the diffraction matter of the cell, and to present that information in a more readily usable form, I produce an image of the unit cell in the form of a contour map by summing the terms of the Fourier series produced by the "Huggins Masks" with an electronic system which scans the light and dark image of the cell and converts it into a contour map.

More particularly, the projection apparatus of the invention for determining the crystal structure of matter comprises an optical projector by means of which a plurality of "Huggins Masks," each of which represents a term of a Fourier series, are simultaneously projected, and thereby optically summed, onto the light-responsive face of a television camera device. The camera device scans the image representing the summation of the terms of the Fourier series and transforms the same into a video signal which is applied to the input circuit of a contour generating network. The contour generating network serves to convert the video signal representing the light and dark pattern resulting from the optical projector into a signal which, when applied to the input circuit of a cathode-ray tube which is also actuated by a suitable raster generator, will produce an image on the luminescent screen of the cathode-ray tube which is a contour map of the distribution of the diffracting matter within the unit cell.

This contour map will actually give a vidid picture of the arrangement of the atoms within the unit cell of the crystal and will resemble the contour map of a mountainous country, the "mountains" corresponding to concentrations of density, or of the atoms, of the diffracting matter. This type of pictorial representation has the great advantage that considerably more qualitative data concerning the individual atoms and their arrangement is afforded since the density is a function of the concentration of the contour lines, a denser atom producing more contour lines per unit length than a less dense atom.

The contour generator is an essential element of the device in that it converts a light and dark density pattern into a contour line pattern. One form of such contour generating network comprises a plurality of multivibrator circuits to each of which is applied the signal resulting from the scanning of the light and dark image by the television camera. Each of the multivibrator circuits are biased at a different level, and actuation of a particular circuit occurs only when the applied signal level achieves a given value. The output circuits of each of the multivibrators include a differentiating network followed by a separating circuit, the output of which is coupled to the grid and cathode of the cathode-ray tube, the system being arranged so that positive pulses are transmitted to the grid of the cathode-ray tube and negative pulses are transmitted to the cathode.

In accordance with a further feature of the invention, means are provided for shaping the contour map to conform to the shape of the unit cell under investigations. This is accomplished by providing a raster shape network which cooperates with the raster generator and the cathode-ray tube.

Another feature of the invention involves providing calibrating means for checking the linearity of the contour generating network. In accordance with this feature of the invention, a mask having a symmetrical pattern of light and dark bands, preferably in the form of concentric annular rings, is disposed in a space provided therefor in the holder for the "Huggins Masks." This symmetrical pattern is projected alone onto the camera scanner, and adjusting means in the circuit of each of the multivibrator networks are adjusted until a symmetrical pattern is produced on the face of the cathode-ray tube. The advantage of this calibrating technique is that no additional effort is required for checking the circuits. All that is involved is that the operator merely switch on the single calibrating mask projection unit, adjust the linearity controls of the multivibrator circuits, switch off the calibrating projection unit, and then switch on the "Huggins Masks" to produce the representation of the unit cell.

The invention will now be described with reference to the accompanying drawing in which:

Fig. 1 shows, diagrammatically, one embodiment of the projection system of the invention;

Fig. 2 is a perspective view of a portion of the optical projector employed in the apparatus of the invention;

Fig. 3 is a front view of the "Huggins" maskholder for the optical projector containing a few representative examples of "Huggins Masks" and a calibration mask in accordance with the invention;

Fig. 4 is a diagrammatic circuit arrangement of one form of a contour generating network according to the invention;

Fig. 5 is a circuit arrangement of one form of discriminator circuit for use in the contour generating network shown in Fig. 4;

Fig. 6 is a schematic diagram of the raster-shape network of the invention;

Fig. 7 shows a contour map.

Referring to Fig. 1, the projection system of the invention comprises an optical projector 10 by means of which a plurality of "Huggins Masks" 11 may be simultaneously projected onto a flat screen 12. The details of the optical projector 10 sufficient for describing the invention in connection therewith are shown in Figs. 2 and 3 and described hereinafter; however, for a more detailed description of the structure and arrangement of the various elements making up the projector, reference is had to an article in the Review of Scientific Instruments, June 22, 1951, vol. 22, 423, entitled "A multiple projector for the Huggins Masks" by McLachlain and Wooley.

Referring now to Figs. 2 and 3, a plurality of point-light-sources 15 are adjustably mounted in spaced arrangement on a supporting member 16. Disposed in front of the light sources 15 is a mask support 17 which comprises a rectangular apertured plate 18 containing brackets 19 for supporting a "Huggins Mask" holder 11 (Fig. 3). The apertured plate 18 has an aperture 21, usually square or rectangular-shaped, corresponding to each of the point sources of light 15. The brackets 19 consist merely of four frame brackets disposed at the corners of the plate 18, only one being shown in the partial view of Fig. 1, for receiving the corners of the maskholder 11 (Fig. 3).

The maskholder 11, which is supported adjacent the apertured plate 18, comprises a series of horizontally-extending slide racks 23 for receiving and supporting a plurality of slideable "Huggins Masks" 24, only two of which are shown for simplicity. The "Huggins Masks" 24 are separated from one another by stops 25. Each of the masks comprises a pair of transparent patterns of black and white bands which are opposite each other, that is to say, where the first pattern has a white band extending in a given direction, the adjacent pattern has a black band of the same width extending in the same direction. This pair of black and white patterns represents one term of a Fourier series. The necessity of having two opposed patterns is that, from the X-ray data from which the patterns are fabricated, it is very difficult to determine the polarity of the particular term of the Fourier series represented by the mask. Consequently, it is necessary to prepare two patterns, one representing a positive polarity term and the other representing a negative polarity term. By simply projecting one or the other patterns onto the screen 12, together, of course, with all the other masks, a skilled operator can judge empirically which polarity for that term is the correct one. It will be noted that one aperture 21 is provided for each pair of patterns 24, the patterns being slideable along the racks 23 so that one or the other pattern may be conveniently placed in front of the aperture 21, and thereby be projected onto the screen 12 by the light emanating from the source 15. Actually, each maskholder 11 contains about 72 masks, though the exact amount is not important; the number of masks employed depends upon the desired resolution.

The optical projector 10 is operated by simultaneously energizing all the light sources 15 to simultaneously project all the masks 24 onto the single screen 12, which may be constituted by a translucent glass plate. If the polarity of the masks has been correctly chosen, a light and dark spot pictorial representation projected on a plane of the unit cell of the crystal from which the X-ray data was obtained will appear on the screen 12.

The light and dark image on the screen 12 is then scanned by a television camera device 30 (Fig. 1), in accordance with the invention, to transform the same into a video signal. Alternatively, the screen 12 may be eliminated and the light and dark image projected directly onto the face of the television camera 30. The video signal appearing at the output of the camera 30 is applied to a suitable contour generating network 35.

One form of contour generating network which may be employed in connection with my invention is shown in Fig. 4. It comprises a plurality of discriminator circuits 36 biased at different levels so that each circuit is responsive only to a signal voltage exceeding a given value. Ten discriminator circuits are shown in Fig. 4; however, I wish it to be understood that any number of circuits is permissible, the number chosen depending on the resolution desired in the final contour map.

The video signal appearing at the output of the television camera 30 is applied to all of the discriminator circuits 36. One form of suitable discriminator circuit is shown in Fig. 5. It comprises a circuit arrangement which is arranged to produce a pulse, whenever the applied signal exceeds a given value, having a duration equal to the time during which the applied signal is greater than said given value. It comprises a pair of pentode tubes 37, 38 connected in a multivibrator arrangement. The input circuit of the first tube 37 comprises a coupling capacitor 39 and a fixed resistor 40 connected in series with a portion of a potentiometer 41 to ground, the applied signal from the television camera 30 being developed across these resistors. The plate circuit of the tube 37 is connected to B+ through a resistor 42. A biasing network for the tube 37, consisting of a series arrangement of a potentiometer 43, a fixed resistor 44 and the potentiometer 41, is coupled between B+ and ground.

The tubes 37 and 38 are coupled through a common cathode resistor 46 and a resistor 47-capacitor 48 parallel combination connected between the plate of the first tube 37 and the control grid of the second tube 38. The control grid of the second tube 38 is also connected to ground through a resistor 50 in series with a potentiometer 51. The output signal of this discriminator is developed across a resistor 52 in the plate circuit of the second tube 38.

In the circuit shown in Fig. 5, a steady-state condition prevails in the absence of an applied signal, which depends upon the bias voltage of the first tube 37, which in turn is dependent upon the setting of the potentiometer 41. This bias voltage can be adjusted by means of the potentiometer 41 to any desired value. The circuit is triggered to a new state when the voltage on the control grid of the first tube 37 exceeds a given voltage, and returns to its original state when that voltage drops below the given voltage. The circuit remains in the new state as long as the applied signal voltage exceeds the given value. The output signal is a square wave with a fixed amplitude and with a duration equal to the time spent by the applied signal voltage above the given level.

Referring back now to Fig. 4, the ten discriminator circuits 36, seven of which are omitted for simplicity, are biased at increasingly higher bias voltages, starting from top to bottom. Consequently, the duration of the square wave output pulses produced by these discriminators will decrease going from top to bottom since the same video amplitude-modulated signal is applied to each of their input circuits. The square wave output signal is then applied to a differentiating circuit consisting of a capacitor 60 and a resistor 61 whereby the square wave is transformed into a positive pulse representing the leading edge of the square wave and a negative pulse representing the trailing edge of the square wave. These two time-spaced pulses are then passed through a separation circuit consisting of a pair of opposed rectifiers 62, e. g., diodes, whereby the negative pulses are separated from the positive pulses. The positive pulses are applied to the grid of a cathode-ray tube 65 and the negative pulses are applied to the cathode of the cathode-ray tube, a spot appearing on the screen of the tube each time that either the grid or cathode is pulsed by a positive or negative pulse, respectively. The spot pattern resulting from the two pulses produced by each of the discriminator circuits actuated by the signal from the television camera appears as a contour map in which the number of contour lines per unit length is proportional to the density of the diffracting matter in the crystal.

A suitable sweep generator 66 is also provided for the cathode-ray tube 65 so that a raster is produced on the screen thereof which corresponds to the scanning rate of the camera for the light and dark image.

In accordance with a further feature of the invention, means are provided for shaping the raster produced by the sweep generator 66 so that the contour-map representation of the unit cell studied corresponds to the shape of said unit cell. Referring to Fig. 6, the raster generator 70 includes a horizontal oscillator 71, which produces a saw-tooth wave, coupled through a coupling capacitor 72 and resistor 63 to a horizontal output or driver stage 64. This driver stage 64 comprises a power pentode tube 66, a cathode biasing network 67 and a plate resistor 68 connected to B+.

A raster oscillator circuit 69, which produces a sawtooth wave with a frequency corresponding to the frequency of the vertical oscillator of the sweep generator 66, is coupled to the input of the horizontal driver stage 64 and serves to slowly vary the bias of that stage as it sweeps out the raster on the face of the cathode-ray tube 65. The result is a tilting or shaping of the raster on the screen of the cathode-ray tube 65. This tilting can be adjusted as desired by merely varying the slope of the saw-tooth wave produced by the raster oscillator 69 in any convenient manner. If the desired shape of the unit cell is square or rectangular, the raster oscillator 69 may be disconnected from the circuit.

In order to assure that the contour map, as shown in Fig. 7, accurately conform to the light and dark pattern of the optical projector 10, calibration means are provided to check the linearity of the discriminator circuits. In accordance with this feature of the invention, the calibration means comprises a density mask 75 (Fig. 3) which is disposed in the holder 11 in front of one of the apertures 21 in the plate 17. This calibration mask 75 may consist of any symmetrical pattern of light and dark bands, lines, arcs or circles, a plurality of concentric, annular rings, the preferred pattern, being shown in the figure. This preferred pattern 75 comprises a pair of adjacently-disposed density patterns in which one pattern has an increasing density from the center to the periphery, and the other pattern has a decreasing density from the center to the periphery, so-called neutral density wedges. Either of the masks may be conveniently slid in front of the aperture 21. The symmetrical pattern of the masks is projected alone onto the center of the screen 12 and then scanned by the television camera 30. The resultant image on the face of the cathode-ray tube should, of course, be also symmetrical. Any deviation from symmetry may be compensated by adjustment of the potentiometers in the discriminator circuits 36. Once the image on the cathode-ray tube has been made symmetrical, the "Huggins Masks" 24 may be projected onto the screen 12 to obtain the image of the unit cell being studied. The advantage of providing the calibration means in this manner is that it provides a simple and expedient technique for quickly calibrating or checking the linearity of the circuits of the device at any step in the investigation of the unit cell.

It is evident from the foregoing that the invention affords many distinct advantages over the heretofore known arrangements. Firstly, it provides a simple and speedy technique for producing an accurate pictorial representation of a unit cell of a crystal. In addition, the contour map on the screen of the cathode-ray tube yields considerably more quantitative information concerning the atoms constituting the unit cell. Lastly, means are included in the apparatus of the invention for rapidly checking and calibrating the linearity of the contour circuits, and for shaping the contour map to conform to the shape of the unit cell under investigation.

While we have described our invention in connection with specific embodiments and applications, other modifications thereof will be readily apparent to those skilled in this art without departing from the spirit and scope of the invention as defined in the appended claims.

What is claimed is:

1. An apparatus for determining the crystal structure of matter comprising, in combination, an optical projector, said projector including a light source, a plurality of masks each comprising a pattern of light and dark bands corresponding to a given term of a Fourier series, and means for simultaneously optically projecting the masks to produce a light and dark image; a television camera for receiving the light and dark image and transforming same into a video signal; contour generating means coupled to said camera for transforming said light and dark video signal into a signal which when applied to a cathode-ray tube will produce a contour map; and a cathode-ray tube coupled to said contour generating means for transforming the contour video signal into a visible contour map.

2. An apparatus for determining the crystal structure of matter comprising, in combination, an optical projector, said projector including a light source, a plurality of masks each comprising a pattern of light and dark bands corresponding to a given term of a Fourier series, and means for simultaneously optically projecting the masks to produce a light and dark image; a television camera for receiving the light and dark image and transforming same into a video signal; a cathode-ray tube; raster means coupled to said cathode-ray tube for producing a raster on said tube; a shaper network coupled to said raster means for shaping the raster on said tube; and contour generating means coupled to said camera and said tube for transforming said light and dark video signal into a signal which when applied to the cathode-ray tube will produce a contour map.

3. An apparatus for determining the crystal structure of matter comprising, in combination, an optical projector, said projector including a light source, a plurality of masks each comprising a pattern of light and dark bands corresponding to a given term of a Fourier series, and means for simultaneously optically projecting the masks to produce a light and dark image; a television camera for receiving the light and dark image and transforming same into a video signal; a contour generating network coupled to said camera for transforming said light and dark video signal into a signal which when applied to a cathode-ray tube will produce a contour map; a cathode-ray tube coupled to said contour generating network for transforming the contour video signal into a visible contour map; and calibration means operatively associated with said optical projector for checking the linearity of the contour generating network.

4. An apparatus for determining the crystal structure of matter comprising, in combination, an optical projector, said projector including a light source, a plurality of masks each comprising a pattern of light and dark bands corresponding to a given term of a Fourier series, and means for simultaneously optically projecting the masks to produce a light and dark image; a television camera for receiving the light and dark image and transforming same into a video signal; a cathode-ray tube; raster means coupled to said cathode-ray tube for producing a raster on said tube; a shaper network coupled to said raster means for shaping the raster on said tube; a contour generating network coupled to said camera and said tube for transforming said light and dark video signal into a signal which when applied to the cathode-ray tube will produce a contour map; and calibration means operatively associated with said optical projector for checking the linearity of the contour generating network.

5. An apparatus for determining the crystal structure of matter as claimed in claim 1 in which the contour generating means includes a multi-channel circuit arrangement, each of said channels comprising a discriminator circuit, a differentiating circuit and a separation circuit in that order.

6. An apparatus for determining the crystal structure of matter as claimed in claim 5 in which the discriminator circuits are biased at different levels.

7. An apparatus for determining the crystal structure of matter as claimed in claim 1 in which the contour generating means includes a plurality of multivibrator circuits each responsive to a signal of given amplitude and adapted to produce a pulse whenever the signal exceeds said given amplitude and having a duration equal to the time during which the signal exceeds said given amplitude.

8. An apparatus for determining the crystal structure of matter as claimed in claim 7 in which each multivibrator circuit is followed by a differentiating circuit for producing from the pulse resulting from the multivibrator a positive and a negative pulse.

9. An apparatus for determining the crystal structure of matter as claimed in claim 2 in which the shaper network comprises a sawtooth wave generator.

10. An apparatus for determining the crystal structure of matter as claimed in claim 3 in which the calibration means comprises a mask having a symmetrical pattern of light and dark portion, and means are provided for projecting said mask onto said camera.

11. An apparatus for determining the crystal structure of matter as claimed in claim 3 in which the calibration means comprises a mask having a plurality of increasingly-dense concentric bands, and means are provided for projecting said mask onto said camera.

12. An apparatus for determining the crystal structure of matter as claimed in claim 4 in which the calibration means comprises a mask having a plurality of increasingly dense concentric bands, and means are provided for projecting said mask onto said camera.

13. An apparatus for determining the crystal structure of matter as claimed in claim 4 in which the contour generating network includes a plurality of multivibrator circuits each responsive to a signal of given amplitude and adapted to produce a pulse whenever the signal exceeds said given amplitude and having a duration equal to the time during which the signal exceeds said given amplitude.

14. An apparatus for determining the crystal structure of matter as claimed in claim 13 in which a differentiating circuit is provided to produce a pair of pulses representing the leading and trailing edge of the pulse produced by the multivibrator, and a separation circuit is provided to separate the pair of pulses.

15. An apparatus for determining the crystal structure of matter as claimed in claim 14 in which one-half of the pairs of pulses are applied to the grid of the cathode-ray tube and the other half of the pairs of pulses are applied to the cathode of the cathode-ray tube.

16. An apparatus for determining the crystal structure of matter as claimed in claim 4 in which the shaper network comprises a saw-tooth wave generator.

References Cited in the file of this patent

UNITED STATES PATENTS

| 2,165,025 | Baldwin | July 4, 1939 |
| 2,258,593 | Black | Oct. 14, 1941 |
| 2,361,447 | Baker | Oct. 31, 1944 |
| 2,467,057 | Simmon | Apr. 12, 1949 |
| 2,591,918 | Cole | Apr. 8, 1952 |

OTHER REFERENCES

A Multiple Projector for the Huggins Masks by D. McLachlan et al., Review of Scientific Instruments, June 1951, pages 423–427.